United States Patent [19]

Lewis

[11] 4,371,818
[45] Feb. 1, 1983

[54] SPINDLE MOTOR CONTROL SYSTEM

[75] Inventor: Martyn A. Lewis, Pacific Palisades, Calif.

[73] Assignee: Minnesota Mining and Manufacturing Company, St. Paul, Minn.

[21] Appl. No.: 197,185

[22] Filed: Oct. 15, 1980

[51] Int. Cl.³ .............................................. H02P 1/02
[52] U.S. Cl. .................................. 318/313; 318/317; 318/342; 318/388
[58] Field of Search ............... 318/313, 317, 341, 342, 318/345 R, 345 B, 685, 696, 385, 388, 393, 312

[56] References Cited

U.S. PATENT DOCUMENTS

| | | | |
|---|---|---|---|
| 3,660,746 | 5/1972 | Milek | 318/696 |
| 3,766,458 | 10/1973 | Nishimura et al. | 318/313 |
| 3,921,047 | 11/1975 | Carter et al. | 318/313 |
| 3,965,405 | 6/1976 | Romano | 318/317 X |
| 4,152,632 | 5/1979 | Peterson | 318/317 |
| 4,227,127 | 10/1980 | Fukaya et al. | 318/317 |
| 4,232,257 | 11/1980 | Harshberger, Jr. | 318/313 X |

Primary Examiner—J. V. Truhe
Assistant Examiner—Richard M. Moose
Attorney, Agent, or Firm—Cruzan Alexander; Donald M. Sell; William D. Bauer

[57] ABSTRACT

A control system for a brushless direct current motor providing linear closed loop speed control when the motor is operating near its desired speed and providing pulse width modulation closed loop speed control when the motor is not operating near its desired speed. A current sensing feedback loop is provided to drive the transistor linearly controlling the electronic commutation of the motor into pulse width modulation when the current through the motor exceeds a predetermined value. An inductor may be coupled in series with control transistor and positive feedback may be supplied to the current sensor.

29 Claims, 9 Drawing Figures

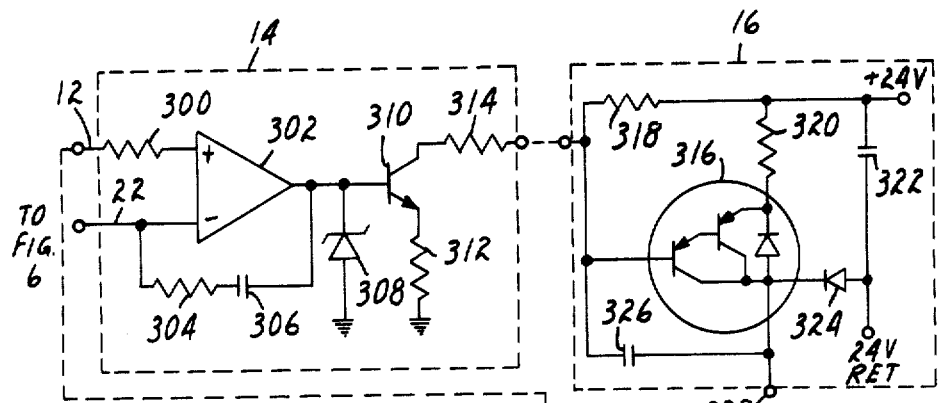
FIG. 8
FIG. 9
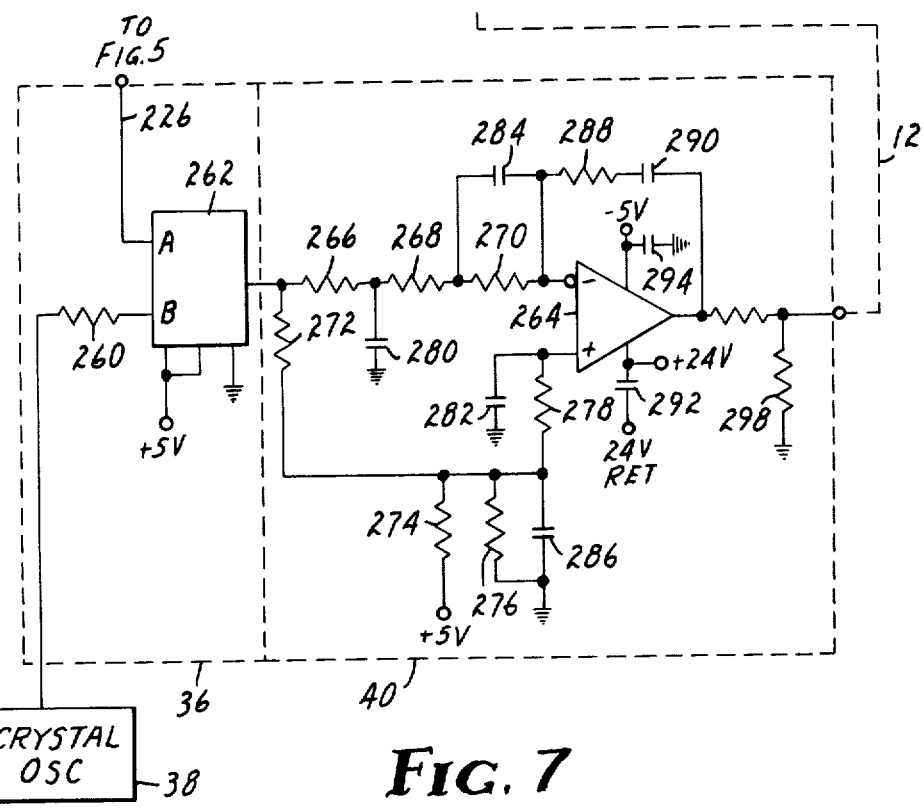
FIG. 7

SPINDLE MOTOR CONTROL SYSTEM

BACKGROUND OF THE INVENTION

The present invention relates generally to disk drives for signal reproducing apparatus and relates more particularly to speed control of a brushless direct current motor utilized for that purpose.

Disk drives are commonly used in signal reproducing apparatus. A disk platter or a plurality of disk platters are utilized for the recording and the reproducing of signals on a magnetic record media. A magnetic disk spins around a spindle supporting the magnetic disk, a transducer is positioned on a record track located on the disk platter which then records and reproduces signals on that record track. The disk platter is typically rotated around its spindle at a relatively constant speed by a spindle drive motor, e.g. 3,125 revolutions per minute. The speed of the transducer with respect to the record track and hence the speed of the spindle drive motor is critical for the accurate and dense recording of signals by the transducer.

In signal reproducing apparatus employing disk drives, it is important to minimize the surge currents required by the disk drive and to minimize the cost of the components utilized. The spindle drive system is a system which has required substantial surge currents while starting from standstill and lesser, but still substantial, surge currents during steady running because of the widespread use of so-called "bang-bang" or "drive-coast" speed control systems. The bang-bang speed control system has a speed variation inferior to that obtained with a continuous speed control system.

Bang-bang speed control systems draw bursts of the full surge current in between "coasting" periods. This results in a speed which oscillates continuously up and down over a range of typically ±0.5%. Furthermore, the power supply is continually subjected to surge currents even while the motor is running at nominal speed. These surge currents cause transient voltages in the power supply distribution system. These transient voltages can have a deleterious effect on other disk drives, tape drives, etc. which typically operate on the same power distribution system.

A motor utilized in a spindle drive capacity in a disk drive system may typically be a brushless direct current motor. The system being driven by the spindle motor has a relatively large inertia and is relatively viscous. The system has a relatively large inertia due to the mass of the disk platter or multiple platters utilized. The system is especially viscous due to the turning resistance of the spindle drive motor, the spindle itself and associated grease and bearing drag, and to the drag which air flowing over the platter surface creates.

SUMMARY OF THE INVENTION

A motor control system is adapted to control an electric motor of the type having a rotor and a plurality of windings having electronic commutation for the plurality of windings, and having a linear speed control feedback loop for the windings utilizing a velocity feedback sensor. The motor control system employs a current sensor coupled to the plurality of the windings for producing a current feedback signal indicative of the amount of the current flowing through the motor. The control system also utilizes a comparator coupled in the linear speed control feedback loop and coupled to the current feedback signal of the current sensor for providing a comparison output responsive to the result of a comparison between the linear speed control feedback loop and the current feedback signal with the comparison output indicative of the desired portion of the rotor of the electric motor and of the current feedback signal. The system further has a transistor circuit coupled to the comparison output biased and capable of operating in both 'on' and 'off' states and operating therebetween. An inductor is coupled between the output of the switching transistor and the electronic commutation. A positive feedback amplifier is coupled to the current sensor operative when the current feedback signal exceeds a predetermined value to accelerate changes in the current feedback signal. The transistor circuit provides linear closed loop speed control feedback to the electronic commutation when the current feedback signal does not exceed the predetermined value and the switching transistor provides an oscillating pulse width modulation control of the electronic commutation when the current feedback signal exceeds the predetermined value.

The oscillating pulse width modulation control may be achieved by the oscillation of the transistor circuit. The control system may also include a driver coupled between the comparator and the transistor circuit to provide the transistor circuit with the amount of drive current required.

The current sensor may utilize a current sensing resistor coupled to the electronic commutation such that the amount of current flowing through the current sensing resistor is responsive to the amount of current flowing through the electronic commutation. It may further have an operational amplifier having two inputs and an output, the two inputs coupled across the current resistor and a feedback resistor coupled between the output of the operational amplifier and the comparator. The operational amplifier may operate in subtractive mode.

The comparator may include an operational amplifier having two inputs selectively coupled to the current sensor and to the linear speed control loop. The comparator may also include a compensation resistor and a compensation capacitor coupled between the input coupled to the current sensor and the output to provide closed loop current control.

The transistor circuit of the control system may include a switching transistor having a base, a collector, and an emitter. The base is coupled to the comparator and to an appropriate biasing circuit. The emitter is coupled to an emitter resistor and the collector is coupled to the inductor and to the cathode of a diode whose anode is coupled to ground. The transistor circuit may further include a capacitor coupled between the collector and the base.

Where the operational amplifier in the current sensor operates as a subtractive operational amplifier, the positive feedback amplifier may include a feedback operational amplifier having two inputs selectively coupled to the output of the subtractive operational amplifier, and to a steady state reference voltage. A diode has a cathode coupled to the output of the feedback operational amplifier and an anode coupled to a feedback resistor which in turn is coupled to an input of the subtractive operational amplifier. The positive feedback amplifier also includes a feedback capacitor coupled between the output of the feedback operational amplifier, and the comparator. This results in positive feedback being introduced to the input side of the current sensor.

The motor being controlled may be a brushless direct current motor where the motor controls the rotation of a record medium for the recording of signals thereon. The record medium may be a medium having a relatively high inertia and may be a disk platter.

A control system connected in this manner utilizes a phase locked loop servo system for continuous linear speed control and also uses a pulse width modulation control for initial start-up.

The linear speed control by itself is disadvantageous. While a linear speed control would operate properly at steady state rotation, its use is not advantageous during initial start-up. At initial start-up, the linear speed control operation is bad because of excessive current draw. Assume that a supply voltage of 24 volts is supplied to the brushless direct current motor; also assume that the motor windings have approximately 2 ohms in resistance with locked rotor. The voltage available to the locked rotor motor would then be 24 volts less the voltage drop across the power transistors (electronic commutation transistors) of about 4 volts. The surge current drawn would therefore be approximately 24 volts minus 4 volts, the quantity divided by 2 ohms or about 10 amperes. Since the motor and its load of disk platters have a fairly high inertia, this current must be sustained for several seconds during start up. This means that all of the power transistors must be rated for a continuous current of at least 10 amperes, since a time period of several seconds exceeds the thermal time constant of the power transistors by a substantial margin. Furthermore, the power supply must be designed to supply a 10 ampere surge current for one or more seconds. This results in transistors and a power supply which are sized much larger than would be dictated by the steady speed running requirements of 1 to 2.5 amperes.

The surge current could be limited to a predetermined value by current feedback. However, in conjunction with a linear power control transistor, the voltage not required by the motor at this predetermined current would be developed across the controlling power transistor (switching transistor or power driver), resulting in a substantial dissipation in the transistor. This technique therefore trades a current surge problem for a transistor dissipation problem, solving only the power supply size problem.

A pulse width modulated control system largely solves the power dissipation problem and the power supply problem. With the pulse width modulation control system, the current is limited to approximately 3 to 5 amperes through the brushless DC motor. However, such a pulse width modulation control system suffers the significant disadvantage of being electrically very noisy at steady state speed.

The control system of the present invention utilizes both modes of operation. The pulse width modulation control system is utilized when the spindle drive motor is starting up in order to conserve size and cost of the power transistors and the power supply. The present invention also utilizes the linear continuous speed control system at steady state in order to control the speed of the motor accurately, to reduce the amount of electrical noise produced and to minimize power supply surges.

The control system of the present invention solves a significant problem even though the start-up of the spindle drive motor is relatively infrequent. The problem is significant first because a power supply is needed whose continuous rating is for the surge power which may be drawn. The problem is significant second because, even though the start-up of the spindle drive motor may be a relatively infrequent event, all the power transistors would also have to be sized for the surge current drawn.

BRIEF DESCRIPTION OF THE DRAWINGS

The foregoing advantages, construction and operation of the present invention will become more readily apparent from the following description and accompanying drawings in which:

FIG. 7 is a schematic diagram of the linear speed control feedback loop;

FIG. 8 is a schematic diagram of the comparator; and

FIG. 9 is a schematic diagram of the switching circuit.

DESCRIPTION OF THE PREFERRED EMBODIMENTS

The basic control of brushless DC motors with a closed loop servo system is well known in the art. A text which describes such control systems is a text entitled *Incremental Motion Control—DC Motors and Control Systems* authored by Benjamin C. Kuo and Jacob Tal, published in 1978 by S. R. L. Publishing Company, P. O. Box 2277, Station A, Champaigne, Ill. 61820 which is hereby incorporated by reference. Basic linear control of DC motor is illustrated in Chapter 10 entitled "Linear DC Servo Amplifiers." Basic phase locked loop control systems and pulse width modulated control systems are shown in Chapter 11, "Pulse Width Modulated Amplifier for DC Servo Systems," Chapter 12, "Velocity Control Systems," Chapter 13, "Position Control Systems," and Chapter 14, "Phase Locked Servo Systems."

Figure 1:
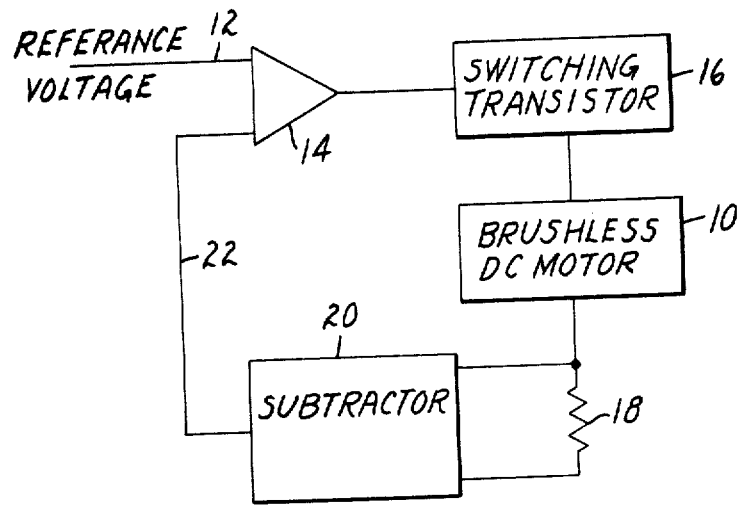
FIG. 1 is a block diagram of the current feedback loop of the control system of the present invention.

A portion of a closed loop speed control system for brushless DC motor 10 which may incorporate the present invention is shown in FIG. 1. A reference voltage 12, generally indicative of the speed error of the brushless DC motor, is coupled to one input of a comparator, operational amplifier 14. The output of the comparator 14 is then connected through a power driver, switching transistor 16, to control the current through the electronic commutation for the brushless DC motor 10. A resistor 18 is coupled in series with the electronic commutation for the brushless DC motor 10. The current flowing through the resistor 18 will therefore be indicative of the amount of current flowing through the electronic commutation of the brushless DC motor 10. Since the resistance of the resistor 18 is fixed, the voltage across resistor 18 will be indicative of the amount of current flowing through the electronic commutation of the brushless DC motor 10. A subtractor 20 is then coupled across resistor 18 to provide at its output 22 a signal indicative of the current flowing through the brushless DC motor 10. This output 22 is coupled to the other input of comparator 14.

The reference voltage 12 will control the current in the brushless DC motor 10 since the current feedback loop will act to minimize the difference between reference voltage 12 and the output 22 of the subtractor 20, which in turn is representative of the current flowing in the brushless D.C. motor 10. Since the reference voltage 12 controls the motor 10 current, it indirectly controls the motor speed. However, since the reference voltage 12 is indicative of speed error, an equilibrium is finally reached wherein the motor speed satisfies the dictates of the speed control loop (not shown in FIG. 1). This control is entirely continuous even if not necessarily quite linear. There are no discrete jumps in the relationship between motor current and reference voltage. The individual amplifiers and power drivers are said to be operating in a "linear" mode as opposed to being saturated, "on", or cut "off".

However, as indicated previously, linear speed control for brushless DC motors, especially those used for disk drives, suffers a disadvantage when the actual speed of the motor 10 is not close to the desired operating speed.

Figure 2:
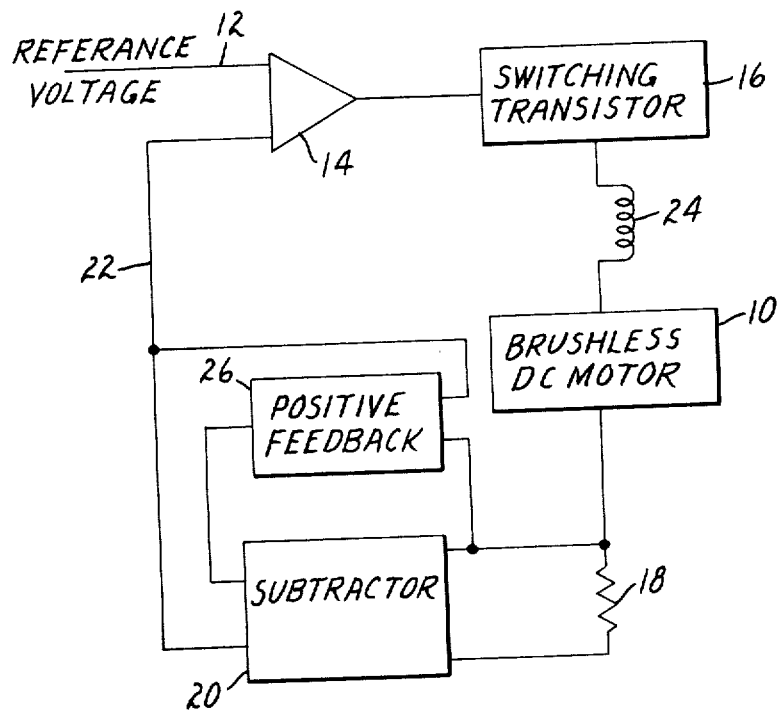
FIG. 2 is a block diagram of the current feedback loop of the control system of the present invention employing positive feedback and employing an inductance in series with the windings of the brushless DC motor.

FIG. 2 illustrates the same feedback control loop as in FIG. 1 with an addition. Again, the reference voltage 12 with comparator, operational amplifier, 14 is sent through, power driver, switching transistor, 16 to the brushless DC motor 10. Also, again, resistor 18 measures the current flowing through the electronic commutation of the brushless DC motor 10 and subtractor 20 supplies on output 22 a signal indicative of that current flow. However, the control loop in FIG. 2 contains two additional components; inductor 24 and positive feedback circuit 26. The inductor 24 and positive feedback circuit 26 cooperate with the remaining elements of the feedback loop to provide an improved operating characteristic. Positive feedback circuit 26 monitors the amount of current flowing through resistor 18 and when it approaches a predetermined threshold positive feedback circuit 26 supplies positive feedback to the input of subtractor 20 and to output 22 to promote a rapid turn off of power driver 16. Inductor 24 coupled between power driver 16 and the brushless DC motor 10 operates during a pulse width operation mode to prevent instantaneous current changes in the electronic commutation of the brushless DC motor 10. The positive feedback circuit 26 will operate to accelerate the changes in the sensing of the current flow through the electronic commutation of the brushless DC motor 10 and supply that information to comparator 14 which then controls power driver 16 on or off in pulse width modulation. Inductor 24 cooperates with these elements to smooth the actual current flowing through the electronic commutation of the brushless DC motor while providing accelerated sensing and switching of the current flow. Inductor 24 also cooperates with the hysteresis created by the positive feedback 26 and the characteristics of the brushless D.C. motor 10 and load to control the operating frequency of the on/off cycling of power driver 16.

When the speed of the brushless DC motor 10 is at or near its desired operating speed, the voltage present on output 22 will drop below a predetermined threshold. This will allow comparator 14 to send an appropriate level to power driver 16 to provide linear speed control for the brushless DC motor 10. However, when the speed of the brushless DC motor 10 does not approximate its desired operating speed, the voltage present on output 22 as determined from subtractor 20 will exceed that threshold. In this case, comparator 14 will send a different signal to power driver 16 which then operates between its on and off states alternatingly supplying and interrupting current flow to the electronic commutation of the brushless DC motor 10 and providing that brushless DC motor 10 with pulse width modulated control. When the speed of the brushless DC motor 10 begins to approximate its desired operating speed, the voltage present on output 22 will drop below that predetermined threshold and the control system changes to its linear control at or near operating speed.

This dual feedback loop control system for the brushless DC motor 10 thus provides a dual mode of control for the brushless DC motor 10. The motor 10 is operated in pulse width modulated control when its speed is not near its desired operating speed such as at startup and is operated in linear control when its speed is at or near its desired operating speed.

Figure 3:
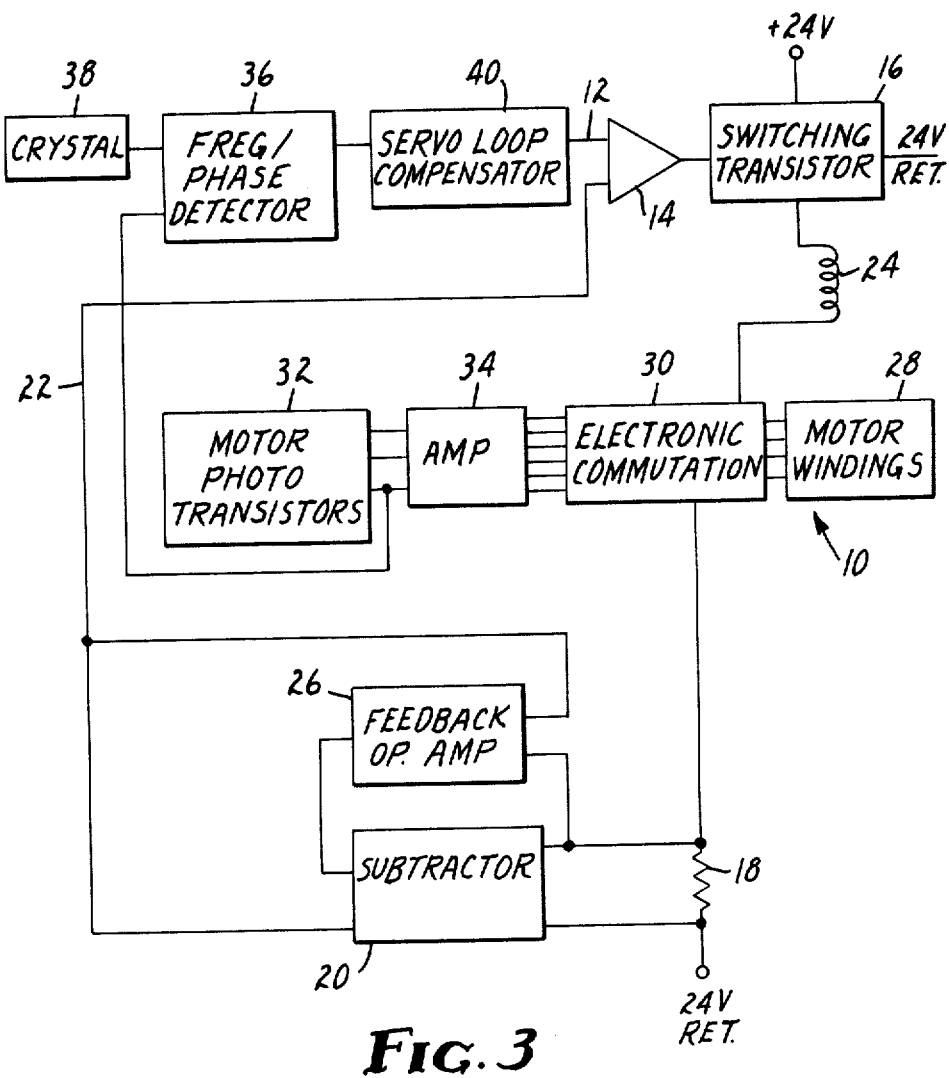
FIG. 3 is a block diagram of the entire closed loop control system for the brushless DC motor.

FIG. 3 illustrates a block diagram of the present invention depicting feedback loop of FIG. 2 in combination with an overall phase locked speed control loop. Here, the brushless DC motor 10 is shown with two parts, motor windings 28 and electronic commutation 30. As in FIG. 2, resistor 18 senses the current flow through the electronic commutation 30, subtractor 20 measures the voltage across the resistor 18, and positive feedback circuit 26 supplies feedback to the subtractor 20 and to output 22 which is then coupled to the input of the comparator 14 and supplied to power driver 16 which in turn is coupled through inductor 24 back to the electronic commutation 30 of the DC motor 10.

The other feedback loop alluded to previously is also illustrated. The brushless DC motor 10 has position sensors which sense and indicate the position of the rotor. These position sensors are illustrated as motor photo transistors 32. With a brushless DC motor 10, it is necessary to know the position of the rotor with respect to the stator in order to supply the proper switching to the electronic commutation 30 to supply current at the proper instants of time to the motor windings 28 in order to run the brushless DC motor. This is necessary because the DC motor, being brushless, has no brushes supplying that commutation. The DC motor must necessarily have the current flow to the respective motor windings switched many times during every rotation. The motor phototransistors 32 are shown supplying their position sensing to amplifiers 34 which provide the appropriate signals to the electronic commutation 30. Such motor phototransistors 32, amplifiers 34 and electronic commutation 30 are well known in the motor art. One of the motor phototransistors 32 providing a position indication of the rotor of the brushless DC motor 10 is supplied to a feedback control circuit. This position indication is supplied to a frequency/phase detector 36 which is also supplied with a source of regular occurring pulses at a predetermined frequency supplied by crystal oscillator 38. The output of the frequency/phase detector 36 is supplied through a servo loop compensator 40 which provides at its output voltage reference signal 12. The use of the frequency/phase detector 36, the crystal oscillator 36 in conjunction with the motor phototransistor 32 through the servo loop compensator 40 is well known in the art. Thus, it can be seen in FIG. 3 that the present invention has two feedback control loops. One control loop is through the frequency/phase detector 36 and servo loop compensator 40. The second control loop is through resistor 18, subtractor 20, positive feedback circuit 26 and switching transistor 16 and inductor 24. This inner loop provides pulse width modulated control of the brushless DC motor 10 when the speed error signal, voltage reference 12, is large and linear control when the speed error signal is small.

Figure 4:
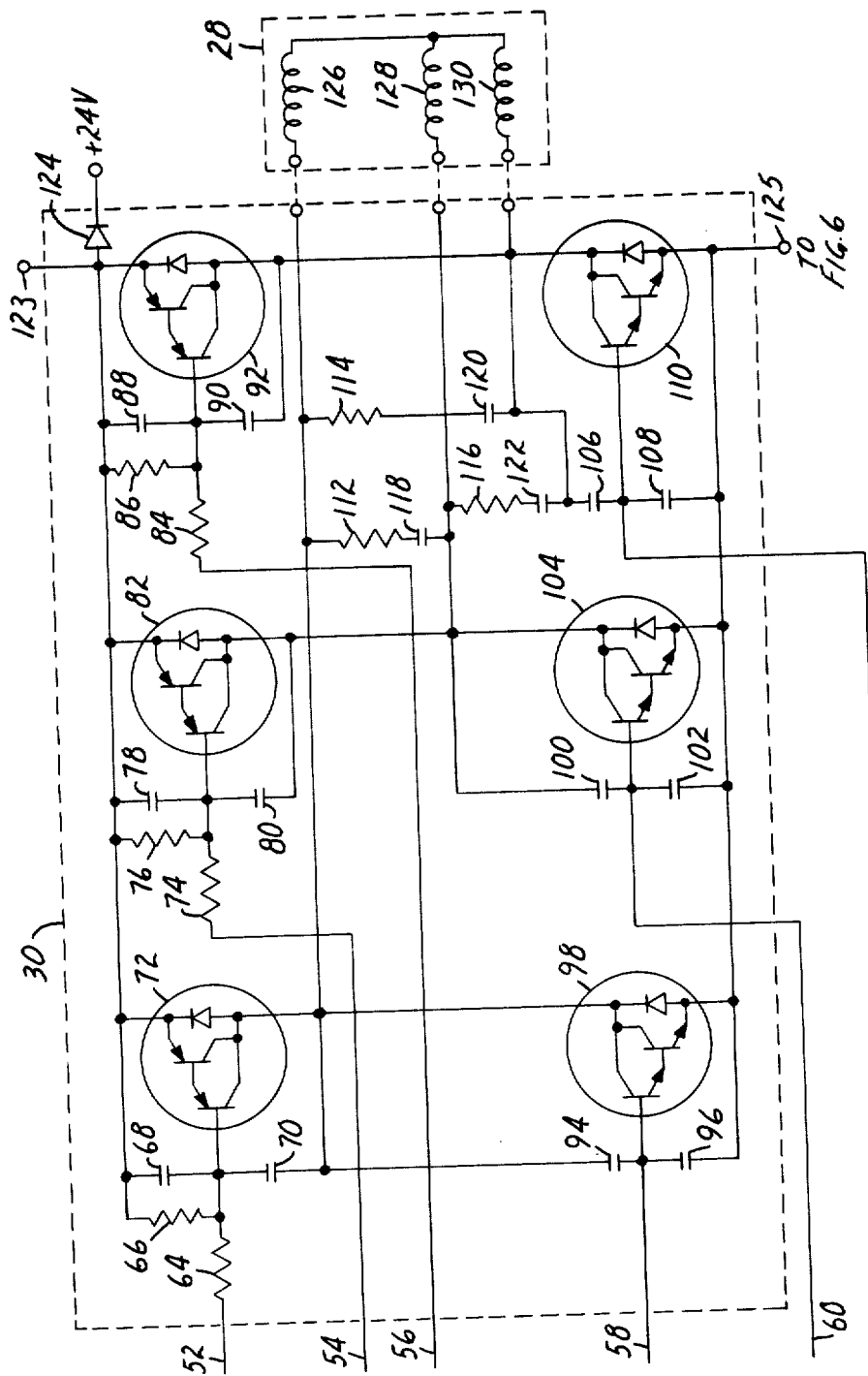
FIG. 4 is a schematic diagram showing the electronic commutation and the phase windings of the brushless DC motor.

FIG. 4 is a schematic representation of the electronic commutation 30 and the motor windings 28. Signals 52, 54, 56, 58, 60 and 62 are supplied from the electronic commutation amplifiers 34 to be described later. Signal 52 is supplied through resistors 64, 66 and capacitors 68 and 70 to transistor 72. Similarly, signal 54 is supplied through resistors 74, 76, capacitors 78, and 80 to transistor 82, and similarly, signal 56 is supplied through resistors 84, 86, capacitor 88, and 90 to transistor 92. Signal 58 is supplied through capacitors 94 and 96 to transistor 98. Signal 60 is supplied through capacitors 100 and 102 to transistor 104. Signal 62 is supplied through capacitors 106 and 108 to transistor 110. Resistors 112, 114 and 116 along with capacitors 118, 120 and 122 and diode 124 to complete the coupling of the electronic commutation 30. Transistor pair 72 and 98 operate to supply current to winding 126, transistors 82 and 104 couple to supply current to winding 128, and transistors 92 and 110 couple to supply current to winding 130, all contained in motor windings 28. In this preferred embodiment of the present invention, the brushless DC motor 10 contains three motor windings 126, 128 and 130.

Figure 5:
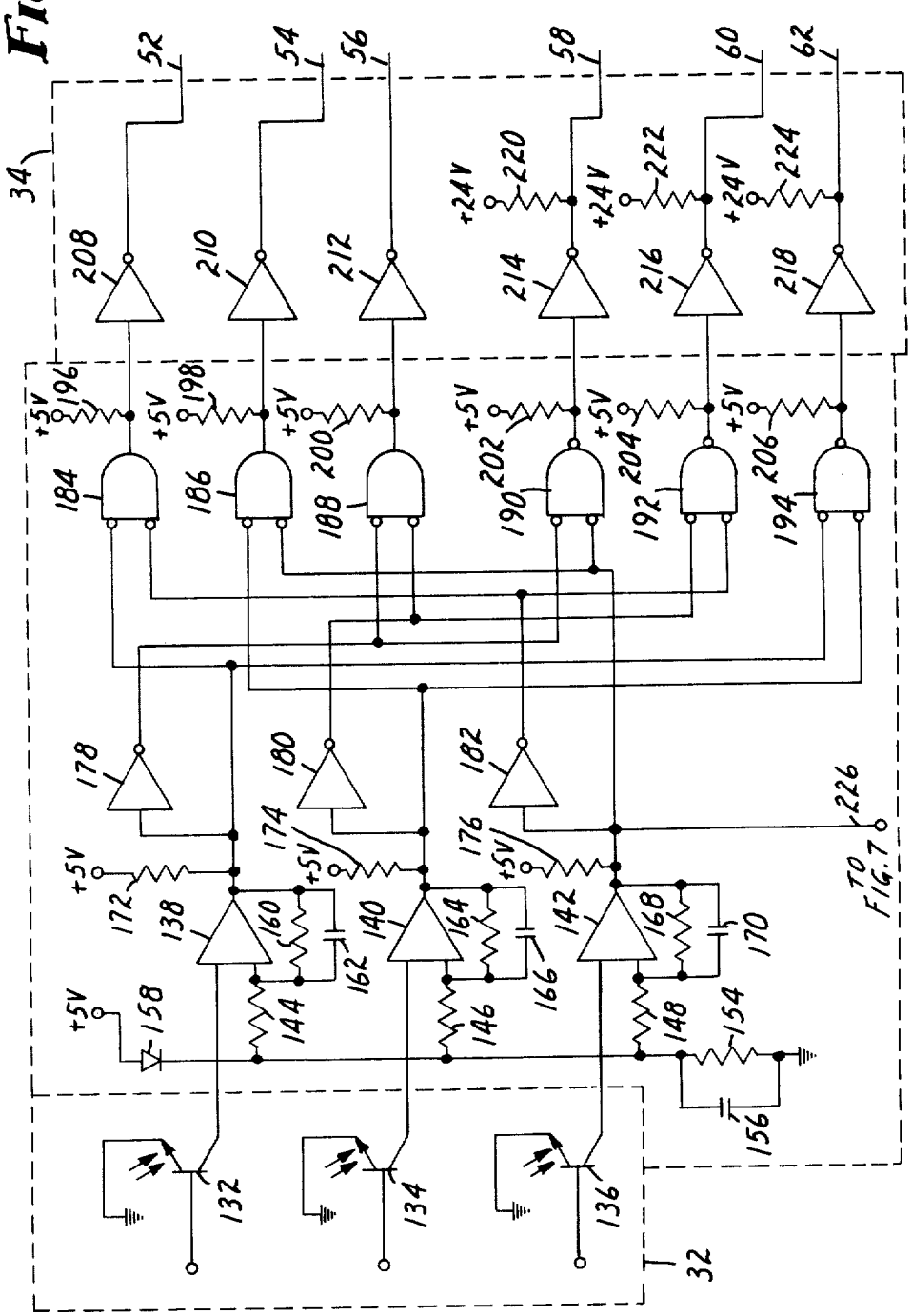
FIG. 5 is a schematic representation of the position sensors of the brushless DC motor and the drive for the electronic commutation.

FIG. 5 is a schematic diagram of the motor phototransistors 32 and the amplifiers 34. The motor phototransistors 132, 134 and 136 provide position indication of the position of the rotor with respect to the stator of the DC motor 10. The output of phototransistors 132, 134 and 136 are fed to one input of operational amplifiers 138, 140 and 142 respectively. Resistors 144, 146 and 148 along with resistors 150, 152 and 154, capacitor 156 and diode 158 bias the operational amplifiers 138, 140, and 142. Resistor 160 and capacitor 162 are coupled to operational amplifier 138. Resistor 164 and capacitor 166 are coupled to operational amplifier 140. Resistor 168 and capacitor 170 are coupled to operational amplifier 142. Resistors 172, 174 and 177 pull up the outputs of operational amplifiers 138, 140 and 142, respectively.

The outputs of operational amplifiers 138, 140, and 142 are fed both directly and through inverters 178, 180 and 182 to a bank of logic gates 184, 186, 188, NOR gates, 190, and 192, and 194, OR gates. Resistors 196, 198, 200, 202, 204, 206 provide pull ups, respectively. NOR gate 184 drives signal 52 through inverter 208. NOR gate 186 drives signal 54 through inverter 210 while NOR gate 188 drives signal 56 through inverter 212. OR gate 190 drives signal 58 through inverter 214. OR gate 182 drives signal 60 through inverter 216 while OR gate 194 drives signal 62 through inverter 218. Resistors 220, 222, and 224 provide pull ups for inverters 214, 216 and 218, respectively. Output 226 is made available from motor phototransistor 136 to be supplied to the frequency/phase detector 36 of the control feedback loop.

Figure 6:
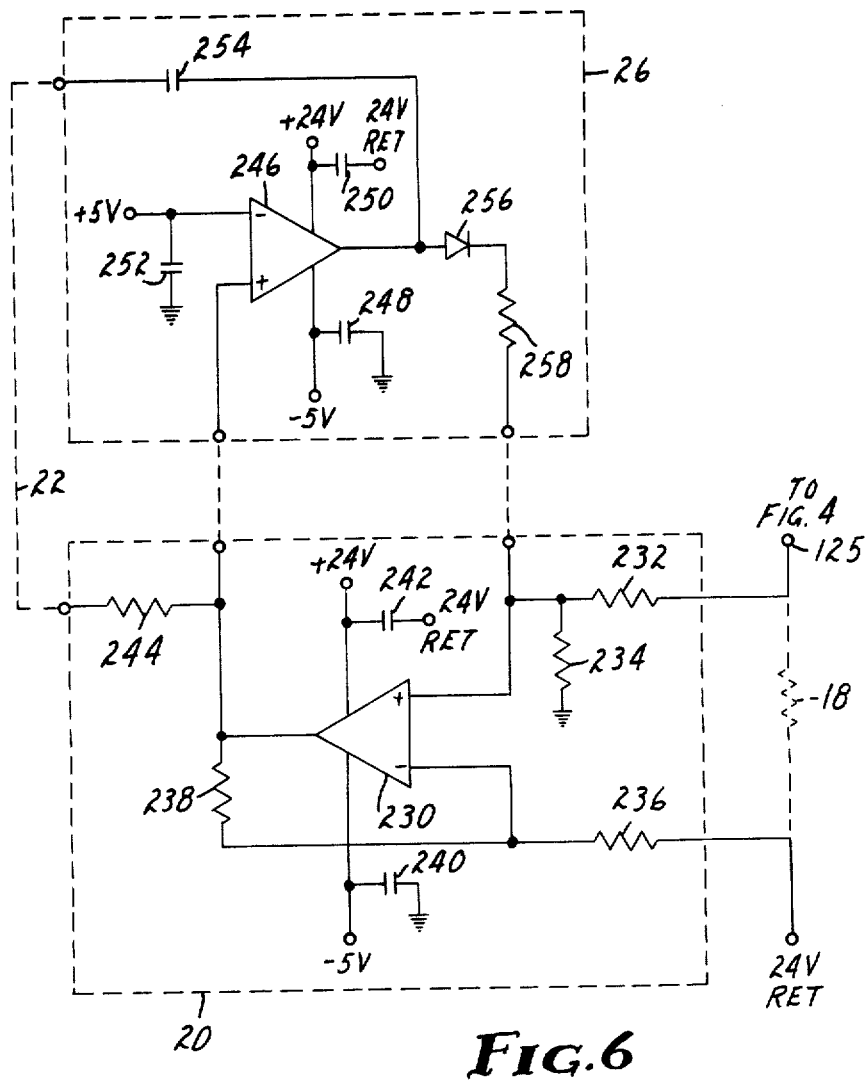
FIG. 6 is a schematic diagram of the current sensor with positive feedback.

FIG. 6 is a schematic diagram of subtractor 20 and positive feedback circuit 26. Resistor 18, as illustrated in FIG. 2, is coupled to the electronic commutation 30. This is also illustrated as reference numeral 125 in FIG. 4. Resistor 18 is coupled between reference numeral 125 in the electronic commutation 30 and a 24 volt return. The resistor 18 is coupled to the 24 volt return rather than to ground in order to subtract any ground return noise which may occur in the power supply. Operational amplifier 230 is coupled across resistor 18 through resistors 232, 234 and 236. The operational amplifier 230 operates as a comparator with resistor 238 coupled between its input and its output. Capacitor 240 and 242 decouple and filter the power connections to the operational amplifier 230. The output of operational amplifier 230, operating as a subtractor, then is supplied to output 22 through feedthrough resistor 244. The positive feedback circuit 26 is coupled to this current sensor with the output of operational amplifier 230 coupled to the positive input of operational amplifier 246. Capacitors 248 and 250 decouple and filter the power connections to this operational amplifier. The negative input to operational amplifier 246 is coupled to a steady state plus 5 volt supply with a filter capacitor 252. The output of operational amplifier 246 is coupled both through capacitor 254 to output 22 and through an isolation diode 256 and resistor 258, back to one of the inputs to operational amplifier 230. In operation, operational amplifier 246 provides positive feedback to the operation of subtractor operational amplifier 230. When the output of operational amplifier 230 is less than approximately 5 volts, the output of operational amplifier 246 is held to approximately minus 3 volts; however, when the voltage at the output of operational amplifier 230 increases above the plus 5 volt threshold, operational amplifier 246 amplifies this voltage toward plus 24 volts, diode 256 conducts supplying this greater voltage back to the input of operational amplifier 230, which in turn increases the voltage at the output of operational amplifier 230 thus providing a positive feedback and accelerating the change in voltage present on output 22 as it passes through plus 5 volts.

FIG. 7 illustrates a schematic diagram of the crystal oscillator 38 and the frequency phase detector 36 and servo loop compensator 40. The crystal oscillator 38 supplies a series of pulses at a fixed predetermined frequency. In a preferred embodiment a frequency of 208.3 hertz is utilized. These signals are fed through resistor 260 to one input of frequency/phase detector chip 262. The other input to the frequency/phase detector chip 262 comes from signal 226 which originates in FIG. 5 from motor phototransistor 136 providing an indication of the position of the rotor of the brushless DC motor 10. The frequency/phase detector chip 262 supplies an average signal less than 2½ volts on its output if the frequency of pulses from the crystal oscillator 38 are greater than the frequency of the position signals coming from motor phototransistor 136, but supplies an average signal greater than 2½ volts at its output when the frequency of signals from the crystal oscillator 38 are less than the frequency of the signal supplied from motor phototransistor 136. When the signals coming from crystal oscillator 38 and the motor phototransistor 136 are equal in frequency, however, if the positive edges of the signals coming from the crystal oscillator 38 lead the positive edges of the signals coming from motor phototransistor 136 then the average signal present at the output of the frequency/phase detector chip 262 will be less than 2½ volts while the opposite will be true if the positive edges from signals from crystal oscillator 38 lag, the positive edges from the signals coming from motor phototransistor 136. Thus, the output of the frequency/phase detector chip 262 will be indicative of the difference between the frequency of the position signals coming from the motor and the frequency of the square wave coming from the crystal oscillator and indicative of the phase of those signals once their frequencies are equal. This signal is then fed to operational amplifier 264 through resistor 266, resistor 268, resistor 270, resistor 272, resistor 274, resistor 276, resistor 278, capacitor 280, capacitor 282 and capacitor 284. Resistors 274 and 276 along with capacitor 286 provide a voltage divider and filter for 2½ volts. Resistor 272 provides a path to that 2½ volts from the output of the frequency/phase detector chip 262. Resistors 266, 268, and capacitor 280 provide a carrier filter for the signal while resistor 270 and capacitor 284 provide a phase lead network for the input to operational amplifier 264. Resistor 288 and capacitor 290 provide an integration and phase lead in network for operational amplifier 264. Capacitors 292 and 294 are used to filter and decouple the power supply for operational amplifier 264. Resistors 296 and 298 on the output of operational amplifier 264 operate to attenuate the output of operational amplifier 264. This results in a reference voltage signal 12 which is indicative of the integral of the position error of the rotor of the brushless DC motor with respect to the square wave from the crystal oscillator.

The reference voltage 12 is then supplied to FIG. 8 showing a schematic diagram of comparator 14. The reference voltage signal 12 is fed through resistor 300 into the positive input of operational amplifier 302. The negative input of operational amplifier 302 comes from the second feedback loop, namely output 22 from FIG. 6. Resistor 304 and capacitor 306 compensate to ensure closed loop stability and provide a steady state DC voltage at the output of operational amplifier 302. Zener diode 308 operates in conjunction with transistor 310 which prevents the base-collector of transistor 310 from being forward biased. Transistor 310 along with resistors 312 and 314 provide an inversion, a power gain, and a level shift to supply the closed loop voltage signal to switching transistor circuit 16 illustrated in FIG. 9. The base of transistor 316 is biased with resistors 318 and the collector and emitters of transistor 316 are biased with resistor 320, capacitor 322 and diode 324. Diode 324 conducts when the collector of transistor 316 falls below minus 0.7 volts to prevent excess voltage on transistor 316. Capacitor 326 is coupled between the collector and the base of transistor 316. The output 328 of transistor 316 is then supplied as in FIG. 2 to a 250 microhenry inductor which in turn is supplied to reference numeral 123 in FIG. 4 of the electronic commutator 30 completing the double closed loop feedback circuitry.

Table 1 contains a listing of components values as follows:

TABLE I

| Reference Numeral | Component | Value or Type Number | Manufacturer |
|---|---|---|---|
| 18 | Resistor | 0.2 ohms, 1 watt | — |
| 24 | Inductor | 250 microhenries | — |
| 64 | Resistor | 470 ohms | — |
| 66 | Resistor | 1000 ohms | — |
| 68 | Capacitor | 0.22 microfarads | — |

TABLE I-continued

| Reference Numeral | Component | Value or Type Number | Manufacturer |
|---|---|---|---|
| 70 | Capacitor | 0.01 microfarads | — |
| 72 | Transistor | TIP 125 | Motorola |
| 74 | Resistor | 470 ohms | — |
| 76 | Resistor | 1,000 ohms | — |
| 78 | Capacitor | 0.22 microfarads | — |
| 80 | Capacitor | 0.01 microfarads | — |
| 82 | Transistor | TIP 125 | Motorola |
| 84 | Resistor | 470 ohms | — |
| 86 | Resistor | 1,000 ohms | — |
| 88 | Capacitor | 0.22 microfarads | — |
| 90 | Capacitor | 0.01 microfarads | — |
| 92 | Transistor | TIP 125 | Motorola |
| 94 | Capacitor | 0.01 microfarads | — |
| 96 | Capacitor | 0.22 microfarads | — |
| 98 | Transistor | TIP 120 | Motorola |
| 100 | Capacitor | 0.01 microfarads | — |
| 102 | Capacitor | 0.22 microfarads | — |
| 104 | Transistor | TIP 120 | Motorola |
| 106 | Capacitor | 0.01 microfarads | — |
| 108 | Capacitor | 0.22 microfarads | — |
| 110 | Transistor | TIP 120 | Motorola |
| 112 | Resistor | 10 ohms | — |
| 114 | Resistor | 10 ohms | — |
| 116 | Resistor | 10 ohms | — |
| 118 | Capacitor | 1.0 microfarads | — |
| 120 | Capacitor | 1.0 microfarads | — |
| 122 | Capacitor | 1.0 microfarads | — |
| 124 | Diode | 1N4001 | — |
| 132 | Phototransistor | 800AM | Clarex |
| 134 | Phototransistor | 800AM | Clarex |
| 136 | Phototransistor | 800AM | Clarex |
| 138 | Comparator | LM339 | National Semiconductor |
| 140 | Comparator | LM339 | National Semiconductor |
| 142 | Comparator | LM339 | National Semiconductor |
| 144 | Resistor | 5.6 kilohms | — |
| 146 | Resistor | 5.6 kilohms | — |
| 148 | Resistor | 5.6 kilohms | — |
| 154 | Resistor | 510 ohms | — |
| 156 | Capacitor | 0.01 microfarads | — |
| 158 | Diode | 1N914 | — |
| 160 | Resistor | 100 kilohms | — |
| 162 | Capacitor | 470 picofarads | — |
| 164 | Resistor | 100 kilohms | — |
| 166 | Capacitor | 470 picofarads | — |
| 168 | Resistor | 100 kilohms | — |
| 170 | Capacitor | 470 picofarads | — |
| 172 | Resistor | 2.2 kilohms | — |
| 174 | Resistor | 2.2 kilohms | — |
| 176 | Resistor | 2.2 kilohms | — |
| 178 | Inverter | SN74LS04 | Motorola |
| 180 | Inverter | SN74LS04 | Motorola |
| 182 | Inverter | SN74LS04 | Motorola |
| 184 | NOR Gate | SN74LS02 | Motorola |
| 186 | NOR Gate | SN74LS02 | Motorola |
| 188 | NOR Gate | SN74LS02 | Motorola |
| 190 | OR Gate | SN74LS32 | Motorola |
| 192 | OR Gate | SN74LS32 | Motorola |
| 194 | OR Gate | SN74LS32 | Motorola |
| 196 | Resistor | 2.2 kilohms | — |
| 198 | Resistor | 2.2 kilohms | — |
| 200 | Resistor | 2.2 kilohms | — |
| 202 | Resistor | 2.2 kilohms | — |
| 204 | Resistor | 2.2 kilohms | — |
| 206 | Resistor | 2.2 kilohms | — |
| 208 | Inverter | ULN2003A | Texas Instruments |
| 210 | Inverter | ULN2003A | Texas Instruments |
| 212 | Inverter | ULN2003A | Texas Instruments |
| 214 | Inverter | ULN2003A | Texas Instruments |
| 216 | Inverter | ULN2003A | Texas Instruments |
| 218 | Inverter | ULN2003A | Texas Instruments |
| 220 | Resistor | 1 kilohm | — |
| 222 | Resistor | 1 kilohm | — |
| 224 | Resistor | 1 kilohm | — |
| 228 | | | |
| 230 | Operational Amplifier | TL082 | Texas Instruments |

TABLE I-continued

| Reference Numeral | Component | Value or Type Number | Manufacturer |
|---|---|---|---|
| 232 | Resistor | 1 kilohm | — |
| 234 | Resistor | 7.15 kilohms | — |
| 236 | Resistor | 1 kilohm | — |
| 238 | Resistor | 7.15 kilohms | — |
| 240 | Capacitor | 0.01 microfarads | — |
| 242 | Capacitor | 0.01 microfarads | — |
| 244 | Resistor | 20 kilohms | — |
| 246 | Operational Amplifier | TL082 | Texas Instruments |
| 248 | Capacitor | 0.01 microfarads | — |
| 250 | Capacitor | 0.01 microfarads | — |
| 252 | Capacitor | 0.01 microfarads | — |
| 254 | Capacitor | 220 picofarads | — |
| 256 | Diode | 1N914 | — |
| 258 | Resistors | 110 kilohms | — |
| 260 | Resistors | 10 kilohms | — |
| 262 | Frequency/Phase Detector | CD4046 | National Semiconductor |
| 264 | Operational Amplifier | TL082 | Texas Instruments |
| 266 | Resistor | 51 kilohms | — |
| 268 | Resistor | 51 kilohms | — |
| 270 | Resistor | 300 kilohms | — |
| 272 | Resistor | 10 kilohms | — |
| 274 | Resistor | 240 ohms | — |
| 276 | Resistor | 240 ohms | — |
| 278 | Resistor | 300 kilohms | — |
| 280 | Capacitor | 0.22 microfarads | — |
| 282 | Capacitor | 0.1 microfarads | — |
| 284 | Capacitor | 0.22 microfarads | — |
| 286 | Capacitor | 0.01 microfarads | — |
| 288 | Resistor | 4.7 megohms | — |
| 290 | Capacitor | 1.0 microfarads | — |
| 292 | Capacitor | 0.01 microfarads | — |
| 294 | Capacitor | 0.01 microfarads | — |
| 296 | Resistor | 1.5 kilohms | — |
| 298 | Resistor | 560 ohms | — |
| 300 | Resistor | 1 kilohms | — |
| 302 | Operational Amplifier | TL082 | Texas Instruments |
| 304 | Resistor | 6.8 kilohms | — |
| 306 | Capacitor | 680 picofarads | — |
| 308 | Zener Diode | 1N4746 | — |
| 310 | Transistor | MPS2222 | Motorola |
| 312 | Resistor | 2.7 kilohms | — |
| 314 | Resistor | 330 ohms | — |
| 316 | Transistor | TIP 125 | Motorola |
| 318 | Resistor | 330 ohms | — |
| 320 | Resistor | 0.2 ohms, 1 watt | — |
| 322 | Resistor | 0.1 microfarads | — |
| 324 | Diode | 1N914 | — |
| 326 | Capacitor | 47 picofarads | — |

Thus, it can be seen that there has been shown and described a novel control system for an electric motor. It is to be understood, however, that various changes, modifications, substitutions in the form and details of the described invention can be made by those skilled in the art without departing from the scope of the invention as defined by the following claims.

What is claimed is:

1. A motor control system for controlling an electric motor of the type having a rotor and a plurality of windings, having electronic commutation for said plurality of windings, and having a linear speed control feedback loop for said windings utilizing a velocity feedback sensor comprising:
   a current sensor coupled to said plurality of said windings for producing a current feedback signal indicative of the amount of the current flowing through said electric motor;
   a comparator coupled in said linear speed control feedback loop and coupled to said current feedback signal of said current sensor for providing a comparison output responsive to the result of a comparison between said linear speed control feedback loop and said current feedback signal, said comparison output indicative of the error in the desired position of said rotor in said electric motor and of said current feedback signals;
   a transistor circuit coupled to said comparison output, said transistor circuit providing linear closed loop speed control feedback to said electronic commutation when said current feedback signal does not exceed a predetermined value and said switching transistor providing an oscillating pulse width modulation control of said electronic commutation when said current feedback signal exceeds said predetermined value.

2. A motor control system as in claim 1 which further comprises an inductor coupled between said output of said switching transistor and said electronic commutation.

3. A motor control system as in claim 2 which further comprises a positive feedback amplifier coupled to said current sensor operative when said current feedback signal exceeds said predetermined value to promote rapid changes in said current feedback signal.

4. A motor control system as in claim 3 wherein said oscillating pulse width modulation control is provided by the self-oscillation of said transistor circuit.

5. A motor control system as in claim 4 which further comprises a driver coupled between said comparator and said transistor circuit to provide said transistor circuit with the amount of drive current required.

6. A motor control system as in claim 5 wherein said transistor circuit is a first transistor and wherein said driver is a drive transistor.

7. A motor control system as in claim 3 wherein said current sensor comprises:
   a current sensing resistor coupled to said electronic commutation such that the amount of current flowing through said current resistor is responsive to the amount of current flowing through said electronic commutation;
   an operational amplifier having two inputs and an output, said two inputs coupled across said current resistor; and
   a feedback resistor coupled between said output of said operational amplifier and said comparator.

8. A motor control system as in claim 1 wherein said operational amplifier operates in subtractive mode.

9. A motor control system as in claim 3 wherein said comparator comprises an operational amplifier having two inputs and an output, one of said two inputs being coupled to said current sensor and the other of said two inputs being operatively coupled in said linear speed control loop, wherein said operational amplifier operates in comparative mode.

10. A motor control system as in claim 9 wherein said comparator further comprises a compensation resistor and a compensation capacitor coupled between said one of said two inputs and said output to provide stability in the closed loop current control.

11. A motor control system as in claim 3 wherein said transistor circuit comprises a switching transistor having a base, a collector and an emitter, said base coupled to said comparator and to a biasing circuit, said emitter being coupled to an emitter resistor and said collector being coupled to said inductor and to the cathode of a diode whose anode is coupled to ground.

12. A motor control system as in claim 11 wherein said transistor circuit further comprises a capacitor coupled between said collector and said base.

13. A motor control system as in claim 12 wherein said operational amplifier is a subtractive operational amplifier and wherein said positive feedback amplifier comprises:
- a feedback operational amplifier having two inputs and an output, one of said two inputs being coupled to said output of said subtractive operational amplifier and the other of said two inputs being coupled to a steady state voltage;
- a diode having a cathode and an anode, said cathode being coupled to said output of said feedback operational amplifier;
- a feedback resistor coupled between said anode and one of said two inputs of said subtractive operational amplifier; and
- a feedback capacitor coupled between said output of said feedback operational amplifier and said comparator;

whereby positive feedback is introduced to the input side of said current sensor.

14. A motor control system for controlling a brushless direct current motor of the type having a permanent magnet rotor and a stator having a plurality of windings, having a position indicator for sensing the position of the magnetic poles of said rotor relative to said plurality of windings and for producing a position signal responsive thereto and having electronic commutation for said plurality of windings, comprising:
- a crystal oscillator producing a square wave signal of a predetermined frequency;
- a frequency/phase detector operatively coupled to said position indicators and said crystal oscillator for producing an output whose average voltage is responsive to the frequency differentiations between said position signal and said square wave signal and responsive to the phase differential between said position signal and said square wave signal;
- a servo loop compensator coupled to said output of said frequency/phase detector having a servo output responsive to said output of said frequency/phase detector for producing an error voltage signal to be utilized in providing closed loop speed compensation;
- a current sensor operatively coupled to said electronic commutation for producing a current feedback signal responsive to the current flowing through said electronic commutation;
- a comparator coupled to said output of said servo loop compensator and coupled to said current feedback signal of said current sensor for providing a comparison output responsive to the result of a comparison of said servo output and said voltage output, said comparison output being indicative of the drive required to minimize the positional error of said permanent magnet rotor with respect to said square wave signal of said crystal oscillator;
- a transistor circuit coupled to said comparison output, said transistor circuit providing linear closed loop speed control feedback to said electronic commutation when said current feedback signal does not exceed a predetermined value and said transistor circuit providing an oscillating pulse width modulation control of said electronic commutation when said current feedback signal exceeds said predetermined value.

15. A motor control system as in claim 14 which further comprises an inductor coupled between said output of said transistor circuit and said electronic commutation;

16. A motor control system as in claim 15 which further comprises a positive feedback amplifier coupled to said current sensor operative when said current feedback signal exceeds said predetermined value to promote rapid changes in said voltage output.

17. A motor control system as in claim 16 wherein said oscillating pulse width modulation control is provided by the oscillation of said transistor circuit.

18. A motor control system as in claim 17 which further comprises a driver coupled between said comparator and said transistor to provide said transistor circuit with the amount of drive current required.

19. A motor control system as in claim 18 wherein said transistor circuit is a first transistor and wherein said driver is a drive transistor.

20. A motor control system as in claim 16 wherein said current sensor comprises:
- a current resistor coupled to said electronic commutation such that the amount of current flowing through said current resistor is responsive to the amount of current flowing through said electronic commutation;
- an operational amplifier having two inputs and an output, said two inputs coupled across said current resistor; and
- a feedback resistor coupled between said output of said operational amplifier and said comparator.

21. A motor control system as in claim 20 wherein said operational amplifier operates in subtractive mode.

22. A motor control system as in claim 16 wherein said comparator comprises an operational amplifier having two inputs and an output, one of said two inputs being coupled to said current sensor and the other of said two inputs being operatively coupled to said servo loop compensator, wherein said operational amplifier operates in comparative mode.

23. A motor control system as in claim 22 wherein said comparator further comprises a compensation resistor and a compensation capacitor coupled between said one of said two inputs and said output to provide closed loop current compensation.

24. A motor control system as in claim 16 wherein said transistor circuit comprises a switching transistor having a base, a collector and an emitter, said base coupled to said comparator and to a biased circuit, said emitter being coupled to an emitter resistor and said collector being coupled to said inductor and to the cathode of a diode whose anode is coupled to ground.

25. A motor control system as in claim 24 wherein said transistor circuit further comprises a capacitor coupled between said collector and said base.

26. A motor control system as in claim 25 wherein said operational amplifier is a subtractive operational amplifier and wherein said positive feedback amplifier comprises:
- a feedback operational amplifier having two inputs and an output, one of said two inputs being coupled to said output of said subtractive operational amplifier and the other of said two inputs being coupled to a steady voltage;

a diode having a cathode and an anode, said cathode being coupled to said output of said feedback operational amplifier;

a feedback resistor coupled between said anode and one of said two inputs of said subtractive operational amplifier; and a feedback capacitor coupled between said output of said feedback operational amplifier and said comparator;

whereby positive feedback is introduced to the input side of said current sensor.

27. A motor control system as in claim 16 wherein said brushless direct current motor controls the rotation of a record media for the recording of signals thereon.

28. A motor control system as in claim 27 where said record media is a medium having a relatively high inertia.

29. A motor control system as in claim 27 where said record media is a disc platter.

* * * * *